United States Patent
Tang et al.

(10) Patent No.: US 9,014,236 B2
(45) Date of Patent: Apr. 21, 2015

(54) METHOD, APPARATUS, RECEIVER, COMPUTER PROGRAM AND STORAGE MEDIUM FOR JOINT DETECTION

(75) Inventors: Zhixun Tang, Beijing (CN); Xie Li, Beijing (CN); Liping Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/348,015

(22) PCT Filed: Sep. 28, 2011

(86) PCT No.: PCT/CN2011/080279
§ 371 (c)(1),
(2), (4) Date: Mar. 27, 2014

(87) PCT Pub. No.: WO2013/044462
PCT Pub. Date: Apr. 4, 2013

(65) Prior Publication Data
US 2014/0241403 A1    Aug. 28, 2014

(51) Int. Cl.
*H04B 1/69* (2011.01)
*H04B 1/707* (2011.01)
(Continued)

(52) U.S. Cl.
CPC .. *H04B 1/7105* (2013.01); *H04B 2201/709763* (2013.01)
USPC ........... 375/152; 375/148; 375/144; 375/142; 375/343; 375/346; 370/335; 370/342; 370/320

(58) Field of Classification Search
CPC ...... H04B 1/707; H04B 1/709; H04B 1/7075; H04B 2201/70707; H04B 1/7117; H04B 1/712; H04B 1/7107; H04B 1/7115; H04B 1/7085; H04B 1/708; H04B 1/7093; H04B 1/1027; H04B 1/123; H04B 1/1036; H04B 7/216; H04B 2201/07701; H04B 7/2628; H04J 13/10; H04J 13/00; H04J 13/16; H04L 7/042; H04L 27/2662; H04L 27/2647; H04L 1/20
USPC ......... 375/148, 144, 142, 143, 150, 152, 346, 375/343; 370/335, 342, 320
See application file for complete search history.

(56) References Cited

U.S. PATENT DOCUMENTS

| 6,704,376 B2 * | 3/2004 | Mills et al. ................... 375/341 |
| 6,947,506 B2 * | 9/2005 | Mills .............................. 375/346 |

(Continued)

FOREIGN PATENT DOCUMENTS

| CN | 1538653 A | 10/2004 |
| CN | 1874189 A | 12/2006 |

(Continued)

OTHER PUBLICATIONS

Klein, A., et al., "Zero Forcing and Minimum Mean-Square-Error Equalization for Multiuser Detection in Code-Division Multiple-Access Channels." Proc. IEEE Transactions on Vehicular Technology, vol. 45, No. 2, May 1996. pp. 276-287. IEEE, Piscataway, NJ.

(Continued)

*Primary Examiner* — Phuong Phu
(74) *Attorney, Agent, or Firm* — Coats & Bennett, PLLC

(57) ABSTRACT

A method for performing joint detection includes adjusting a ranking order of codes in a matched filtering result, and a ranking order of column vectors in a system submatrix according to the power. The joint detection is performed using an adjusted matched filtering result and an adjusted system submatrix, and acquires demodulated signals corresponding to the codes. The codes that have high power will be demodulated first. This ensures accuracy of demodulation, inhibits erroneous propagation effect, and improves accuracy of the joint detection.

19 Claims, 3 Drawing Sheets

(51) Int. Cl.
*H04B 1/713* (2011.01)
*H04B 1/7105* (2011.01)

(56) References Cited

U.S. PATENT DOCUMENTS

| | | | | |
|---|---|---|---|---|
| 7,031,284 | B2* | 4/2006 | Supplee et al. | 370/335 |
| 7,554,956 | B2* | 6/2009 | Kang et al. | 370/335 |
| 7,684,378 | B2* | 3/2010 | Kwak et al. | 370/342 |
| 7,817,754 | B2* | 10/2010 | MacLeod | 375/343 |
| 7,916,841 | B2* | 3/2011 | Yan et al. | 379/88.07 |
| 7,953,958 | B2* | 5/2011 | Shen et al. | 712/35 |
| 2002/0085623 | A1* | 7/2002 | Madkour et al. | 375/148 |
| 2004/0116122 | A1* | 6/2004 | Zeira et al. | 455/445 |
| 2004/0213360 | A1 | 10/2004 | McElwain | |
| 2004/0259504 | A1* | 12/2004 | Onggosanusi et al. | 455/67.13 |
| 2006/0115026 | A1 | 6/2006 | MacLeod | |
| 2007/0036250 | A1* | 2/2007 | Niedzwiecki | 375/348 |
| 2012/0257548 | A1* | 10/2012 | Yan et al. | 370/280 |

FOREIGN PATENT DOCUMENTS

| | | |
|---|---|---|
| CN | 1874190 A | 12/2006 |
| CN | 1885717 A | 12/2006 |
| CN | 1885727 A | 12/2006 |
| CN | 101035319 A | 9/2007 |
| CN | 101170366 A | 4/2008 |
| CN | 101753169 A | 6/2010 |
| EP | 1469610 A1 | 10/2004 |
| WO | 02065658 A1 | 8/2002 |
| WO | 2004012341 A1 | 2/2004 |

OTHER PUBLICATIONS

3GPP. "Physical channels and mapping of transport channels onto physical channels (FDD)." 36 pages. TS 25.211 V2.5.0. TSG RAN #5 (99)475. Oct. 1999. 3GPP, Sophia-Antipolis, France.

International Search Report, International application No. PCT/CN2011/080279. Date of mailing Jul. 5, 2012. SIPO, Beijing, China.

* cited by examiner

METHOD, APPARATUS, RECEIVER, COMPUTER PROGRAM AND STORAGE MEDIUM FOR JOINT DETECTION

FIELD OF THE INVENTION

The present invention relates to a wireless communication technology, and in particular to a method, an apparatus, a receiver, a computer program and a storage medium for improving performance of joint detection.

DESCRIPTION OF THE PRIOR ART

Even though embodiments of the invention will be described herein in relation to Time Division-Synchronous Code Division Multiple Access (TD-SCDMA), it should be noted that embodiments of the invention may be equally applicable in other scenarios. Thus, the invention is not limited to TD-SCDMA.

Spreading of data may consist of two operations. One is channelization and the other is scrambling. First, each data symbol is spread with a channelization code. The resultant sequence is then scrambled by a scramble code. The channelization code may take the form of orthogonal Variable Spreading Factor (OVSF) code in a TD-SCDMA system. Because the scramble code for a cell is the same, while the channelization codes for different users belonging to the cell are different, the channelization code used by a user can be referred to as a user code and the channelization code causing interference with user codes can be referred to as an interference code. Regarding more detailed explanation on all sorts of codes, please refer to 3GPP TS 25.223 V5.3.0. If not otherwise stated, a reference to a code or codes in the following description typically refers to channelization codes.

In a Direct Sequence-Code Division Multiple Access (DS-CDMA) system, a Code Division Multiple Access (CDMA) technology is used. Since different signals have different propagation delay and since there exist interference codes, the spreading code sets adopted by the signals are not completely orthogonal at reception. Such an interference caused by a non-zero cross correlation coefficient is called as Multiple Access Interference (MAI). Generally, a Matched Filter (MF) or a Multi-user Detector (MUD) (joint detector (JD)) is used in the CDMA system to recover the signals before spreading and scrambling. With the traditional MF it is impossible to effectively inhibit the MAI, but the MUD can remove the influence of the MAI in a better manner.

In the case of a strong interference from an intra-frequency neighbor cell, the performance of the current JD technology will decrease rapidly. Especially under an adverse condition where the power of the intra-frequency neighbor cell is substantially greater than a local cell, there exists a need (e.g. in the current TD-SCDMA system) to remove the influence of the intra-frequency neighbor cell and improve reception performance of signals from the local cell.

SUMMARY OF THE INVENTION

The present invention provides a method, an apparatus, a receiver, a computer program and a storage medium, so as to improve the performance of joint detection.

In some embodiments of the present invention, a power of each of a number of codes in a matched filter result of a received signal is acquired, an ranking order of the codes in the matched filtering result and an ranking order of column vectors corresponding to the codes in a system submatrix are adjusted based on the power so as to perform joint detection using the adjusted matched filtering result and the adjusted system submatrix, and demodulated signals corresponding to the codes are obtained. The code having higher power is demodulated firstly. This ensures accuracy of the demodulation, inhibits an erroneous propagation effect, and improves accuracy of the joint detection.

In some embodiments of the present invention, a power of the code with a code sequence number is a sum of the power of all elements with the code sequence number in the matched filtering result.

In some embodiments of the present invention, in the adjusted matched filtering result, the higher the power of the code, the lower the ranking order of the code in the symbol. In the adjusted system submatrix, the higher the power of the code, the lower the ranking order of the vector corresponding to the code. This ensures that the code having high power will be demodulated firstly, and thus it is easy to be implemented.

In some embodiments of the present invention, a non-linear joint detection algorithm, e.g., a joint detection algorithm based on decision feedback demodulation, is used to perform joint detection, so as to improve accuracy of the joint detection.

In some embodiments of the present invention, after acquiring demodulated signals corresponding to the codes in an original symbol, the order of the demodulated signals is recovered according to an ranking order of the codes in the original symbol, so as to obtain a final demodulation result. Hence, the joint detection result can be directly used by the other processing, thereby to facilitate the use.

The present invention is not limited to the above features and advantages. In fact, a person skilled in the art will find the other features and advantages after reviewing the embodiments and drawings below.

DETAILED DESCRIPTION OF THE PREFERRED EMBODIMENTS

Figure 1:
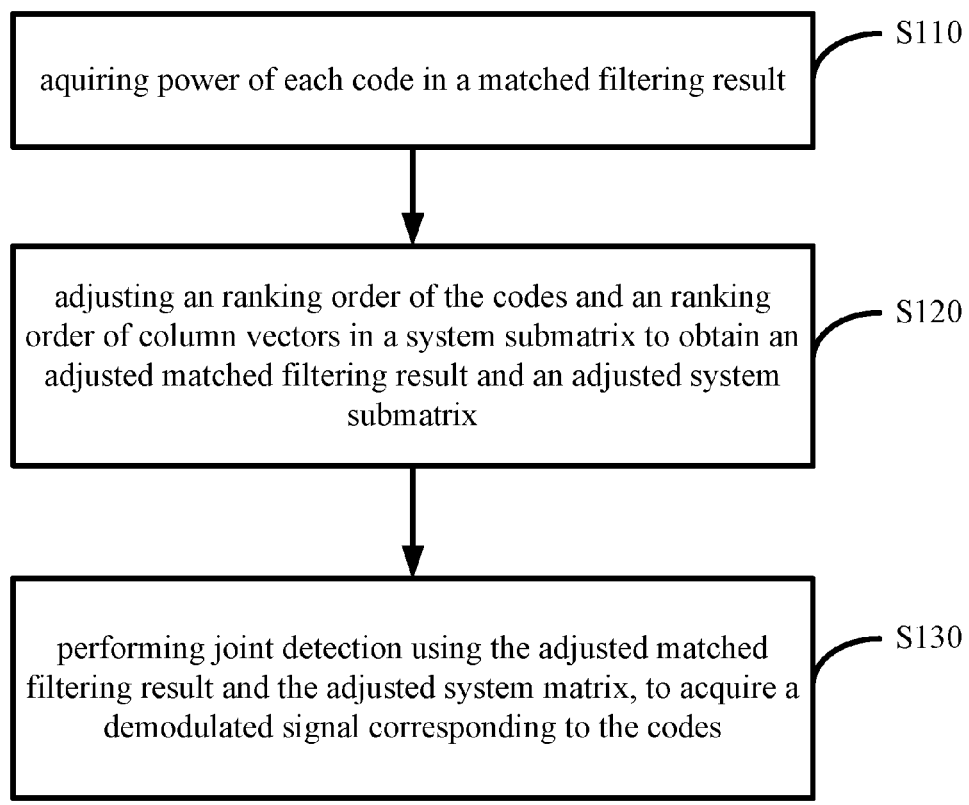
FIG. 1 is a flow chart showing a method for joint detection according to some embodiments of the present invention.

A method, an apparatus, a receiver, a computer program and a storage medium for joint detection are provided in embodiments of the present invention to sort power of codes and perform joint detection using the sorted signals, thereby to improve performance of the joint detection.

In the joint detection method according to the embodiments of the present invention, a matched filtering result $e_{mf}$ of a received signal e is sorted according to the power of the codes, so that the joint detection can solve the signals having higher power in a symbol firstly so as to improve performance of the joint detection.

In order to better understand the present invention, some basic concepts related to the embodiments are firstly explained as following:

$e_{mf}$ indicates a matched filtering result which is column vector.

Presumed that the number of codes is Kru and the number of symbols of the matched filter result of a received signal is N, an output of the matched filter is shown as follows:

$$e_{mf}=[e_{mf,1}^1, e_{mf,1}^2, \ldots, e_{mf,1}^{Kru}, e_{mf,2}^1, e_{mf,2}^2, \ldots, e_{mf,2}^{Kru}, \ldots, e_{mf,N}^1, e_{mf,N}^2, \ldots, e_{mf,N}^{Kru}]^T$$

wherein:

elements $e_{mf,1}^1, e_{mf,1}^2, \ldots, e_{mf,1}^{Kru}$ constitute a first symbol;
elements $e_{mf,2}^1, e_{mf,2}^2, \ldots, e_{mf,2}^{Kru}$ constitute a second symbol;
....
elements $e_{mf,N}^1, e_{mf,N}^2, \ldots, e_{mf,N}^{Kru}$ constitute an Nth symbol.
elements $e_{mf,1}^1, e_{mf,2}^1, \ldots, e_{mf,N}^1$ constitute a first code;
elements $e_{mf,1}^2, e_{mf,2}^2, \ldots, e_{mf,N}^2$ constitute a second code;
....
elements $e_{mf,1}^{Kru}, e_{mf,2}^{Kru}, \ldots, e_{mf,N}^{Kru}$ constitute a Kruth code;

It is found that, the matched filtering result is a sequence, and a ranking order of a code in the matched filtering result is determined by the locations of elements in the symbols.

The lower the ranking order of a code, the lower the ranking order of the elements in a symbol.

Taking $e_{mf}$ for example, the first code has the lowest ranking order, so elements $(e_{mf,1}^1, e_{mf,1}^2, \ldots, e_{mf,1}^{Kru})$ composing the first code are located at the front of symbols, and the Kruth code has the highest ranking order, so elements $(e_{mf,1}^{Kru}, e_{mf,2}^{Kru}, \ldots, e_{mf,N}^{Kru})$ composing the Kruth code are located at the end of symbols.

A ranking order of a code in the matched filtering result can be adjusted by change the locations of elements in symbols.

A indicates a system matrix which is determined according to the spreading code and channel impulse responses of all users which can be constructed based on information on the active windows:

$$A = \begin{bmatrix} B & & 0 \\ & B & \\ & & \ddots \\ 0 & & B \end{bmatrix}$$

Where, the system submatrix B is shown as following:

$$B = \begin{bmatrix} b_1^{(1)} & b_1^{(2)} & \ldots & b_1^{(K)} \\ b_2^{(1)} & b_2^{(2)} & \ldots & b_2^{(K)} \\ \vdots & \vdots & \ldots & \vdots \\ b_Q^{(1)} & b_Q^{(2)} & \ldots & b_Q^{(K)} \\ b_{Q+1}^{(1)} & b_{Q+1}^{(2)} & \ldots & b_{Q+1}^{(K)} \\ \vdots & \vdots & \ldots & \vdots \\ b_{Q+W-1}^{(1)} & b_{Q+W-1}^{(2)} & \ldots & b_{Q+W-1}^{(K)} \end{bmatrix}$$

Where, the column vector $b^{(k)}$ corresponding to the kth codes is shown as following:

$$b^{(k)}=[b_1^{(k)}, b_2^{(k)} \ldots b_{Q+W-1}^{(k)}]'=v^{(k)}*h^{(k)} \quad k=1,\ldots,K$$

where, $v^{(k)}$ is dot product of a spreading code and a scrambling code;

$h^{(k)}$ is the channel estimation corresponding to the active spreading code;

K is the number of the codes;

W is the length of a system impulse response window;

Q is a system spreading factor.

The lower the ranking order of the column vector in the system submatrix, the closer to the left of the system submatrix. In other words, the lower the ranking order of the column vector in the system submatrix, the smaller a column sequence number of the column vector in the system submatrix.

As shown in FIG. 1, a method for joint detection according to the embodiments of the present invention comprises:

Step S110: acquiring a power of each of a number of codes in a matched filtering result of a received signal;

Step S120: adjusting an ranking order of the codes in the matched filtering result and an ranking order of column vectors in a system submatrix corresponding to the matched filtering result based on the power of the codes, to obtain an adjusted matched filtering result and an adjusted system submatrix; and Step S130: performing joint detection using the adjusted matched filtering result and the adjusted system submatrix, to acquire demodulated signals corresponding to the codes, wherein, when performing joint detection using the adjusted matched filtering result and the adjusted system submatrix, a first code is demodulated prior to a second code, and the power of the first code is higher than the power of the second code;

The solution according to the embodiments of the present invention has the following beneficial effects:

The joint detection may solve the signal with higher power firstly, and the signal with high power may be demodulated more accurately.

In the joint detection, the demodulated signal is used for the demodulation of the subsequent signals. Thus, the more the accuracy of the demodulated signal, the more the accuracy of the signal to be demodulated subsequently when the demodulated signal is used for the demodulation of the subsequent signals. This inhibits an erroneous propagation effect and improves accuracy of the joint detection.

In the joint detection, the characteristics of a triangular matrix are used for the last stage of demodulation. At first, an equation having only one unknown number is solved, and the solved unknown number is then substituted into an equation having two unknown numbers, etc. All solutions are obtained by iteration, and such procedure is actually a procedure of removing interference. It is advantageous to remove a strong interference signal as soon as possible when the power of the signal demodulated firstly is higher; thereby the performance of the joint detection is improved.

Detailed explanations are provided hereinafter on how to perform joint detection using the method according to the embodiments of the present invention.

At first, in the embodiments of the present invention, the power of the codes needs to be acquired so as to facilitate the subsequent adjustment of the ranking order of the codes and the ranking order of the column vectors of the system submatrix. The acquiring of the powers corresponding to the codes may be implemented by various methods.

In an implementation, a sum of the power of all elements with a code sequence number in the matched filtering result may also be used as the power of the code with the code sequence number.

The detailed description is given as follows.

As mentioned hereinbefore, presumed that the number of codes is Kru and the number of symbols is N, an output of the matched filter is shown as follows:

$$e_{mf}=[e_{mf,1}^1, e_{mf,1}^2, \ldots, e_{mf,1}^{Kru}, e_{mf,2}^1, e_{mf,2}^2, \ldots, e_{mf,2}^{Kru}, \ldots, e_{mf,N}^1, e_{mf,N}^2, \ldots, e_{mf,N}^{Kru}]^T$$

Thus, the power of the first code is a sum of the power of signals (or elements) $e_{mf,1}^1, \ldots, e_{mf,N}^1$ whose code sequence number (a superscript of the elements) is 1; ...; and the power of the $Kru^{th}$ code is a sum of the power of signals $e_{mf,1}^{Kru}, \ldots, e_{mf,N}^{Kru}$ whose code sequence number is Kru. That is, the power $P^{(k)}$ corresponding to the $k^{th}$ code is calculated by the following equation:

$$P^{(k)} = \sum_{i=1}^{N} |e_{mf,i}^k|^2, k=1,2,\ldots,Kru.$$

Presumed that $P^{(8)} > P^{(7)} > \ldots > P^{(Kru-1)} > P^{(1)} > P^{(2)}$, the ranking order of the codes in the matched filtering result is adjusted according to the above-mentioned order of power.

In the above implementation, merely a part of the symbols (e.g., a half of the symbols) may also be used for calculating the power.

The power of the codes can be obtained by the above embodiments. This provides an adjustment basis for the ranking order of the codes and the ranking order of the column vectors.

In the prior art, no matter whether a zero-forcing algorithm, an MMSE algorithm, or any other joint detection algorithm is used, a soft decision result $\hat{d}$ of the signal transmitted at a transmitting end is calculated by the following formula:

$$\hat{d} = (HH^H)^{-1} e_{mf}$$

For different joint detection algorithms, the calculation modes for triangular matrix H are different. If a linear zero forcing equalization algorithm is used, then $HH^H = A^H A$. If the MMSE equalization algorithm is used, then $HH^H = A^H A + \sigma^2 I$.

However, $e_{mf}$ is the matched filtering result of the received signal, and H is calculated according to a system matrix corresponding to the received signal.

Thus, during the solution procedure of the above equation, the signal demodulated firstly may be a signal with the lowest power or a signal with higher power, which depends on the occupancy situation of the codes. When the last code is occupied by a very weak signal, the weak signal is demodulated firstly and used for the subsequent demodulation of the other signals. Due to the existence of the other strong interference signals, there exists a low possibility to demodulate the weak signal accurately as compared with the signal with high power. Moreover, because the weak signal is used for the subsequent demodulation of the other signals, i.e., a signal that is demodulated inaccurately is used for the demodulation of the other signals, the demodulation result of the other signals will also be inaccurate with high probability, thereby the performance of the joint detection will be reduced.

In the embodiments of the present invention, in order to avoid the performance of the joint detection from being reduced, the power of the codes is determined, and then the matched filtering result and the system submatrix are adjusted according to the power of the codes. Thus, the codes with higher power can be demodulated firstly so as to improve the performance of the joint detection.

Following are the detailed descriptions on the process of adjusting the ranking order of the codes in the matched filtering result and the ranking order of the column vectors in the system submatrix according to the calculated power of the codes so as to obtain the adjusted matched filtering result and the adjusted system submatrix.

At first, it needs to adjust the ranking order of the codes in the matched filtering result according to the power of the codes. In the adjusted matched filtering result of the received signal, the higher the power of the code, the lower the ranking order of the code in the symbol.

As mentioned hereinbefore, presumed that the number of codes is Kru and the number of symbols is N, the output of the matched filter is as shown as follows:

$$e_{mf} = [e_{mf,1}^1, e_{mf,1}^2, \ldots, e_{mf,1}^{Kru}, e_{mf,2}^1, e_{mf,2}^2, \ldots, e_{mf,2}^{Kru}, \ldots, e_{mf,N}^1, e_{mf,N}^2, \ldots, e_{mf,N}^{Kru}]^T$$

Presumed that the power of the code is calculated according to said method, the power $P^{(k)}$ corresponding to code k is calculated by the following equation:

$$P^{(k)} = \sum_{i=1}^{N} |e_{mf,i}^k|^2, k=1,2,\ldots,Kru.$$

Presumed that $P^{(8)} > P^{(7)} > \ldots > P^{(Kru-1)} > P^{(1)} > P^{(2)}$, the adjusted matched filtering result is:

$$[e_{mf,1}^2, e_{mf,1}^1, e_{mf,1}^{Kru-1}, \ldots, e_{mf,1}^7, e_{mf,1}^8, \ldots, e_{mf,N}^2, e_{mf,N}^1, e_{mf,N}^{Kru-1}, \ldots, e_{mf,N}^7, e_{mf,N}^8]^T$$

It is found that, for each symbol in the adjusted matched filtering result, the higher the power of the code, the lower the ranking order of the code in the symbol.

In the embodiments of the present invention, it also needs to adjust the ranking order of the column vectors in the system submatrix B according to the power of the code. In the adjusted system submatrix, the higher the power of the code, the lower the ranking order of the vector corresponding to the code.

Presumed that the original system submatrix is $B = [B_1, B_2, \ldots, B_{Kru}]$, and the adjusted system submatrix is $$B_{sort} = [B_2, B_1, B_{Kru-1} \ldots, B_7, B_8]$$

It is found that, in the adjusted system submatrix, the higher the power of the code, the lower of the ranking order of the vector corresponding to the code.

After the above-mentioned adjustment, the adjusted system submatrix may be used to generate an adjusted system matrix $A_{sort}$. Cholesky decomposition is performed on the adjusted system matrix to obtain H for the joint detection.

For different joint detection algorithms, the calculation modes for H are different. If an MMSE algorithm is used, $A_{sort}^H A_{sort} + \sigma_2 I = HH^H$. If a ZF algorithm is used, $A_{sort}^H A_{sort} = HH^H$. Other calculation modes for H can also be used.

In order to facilitate the subsequent processing, after acquiring the demodulated signals corresponding to the codes in the symbol, the method according to the embodiments of the present invention further includes recovering the ranking order of the demodulated signals in accordance with the original ranking order of the codes in the matched filtering result, so as to obtain a final demodulation result.

Taking the first symbol in the matched filtering result as an example. For the signals $e_{mf,1}^1, e_{mf,1}^2, \ldots, e_{mf,1}^{Kru}$, presumed that $P^{(8)} > P^{(7)} > \ldots > P^{(Kru-1)} > P^{(1)} > P^{(2)}$, the demodulated signals obtained are sorted as follows: a demodulated signal corresponding to the $8^{th}$ code, a demodulated signal corresponding to the $7^{th}$ code, ..., a demodulated signal corresponding to the $(Kru-1)^{th}$ code, a demodulated signal corresponding to the first code, and a demodulated signal corresponding to the second code.

However, in the subsequent processing, it also needs to perform processing according to the original ranking order of the codes in the matched filtering result. At this time, the demodulated signals of the codes are re-sorted so as to facilitate the subsequent processing. That is, the demodulated signals for the subsequent processing are: the demodulated signal corresponding to the first code, the demodulated signal corresponding to the second code, ..., the demodulated signal corresponding to the $(Kru-1)^{th}$ code, and the demodulated signal corresponding to the $Kru^{th}$ code.

The joint detection can be performed after obtaining H and the adjusted matched filtering result. In the embodiments of the present invention, the joint detection may use a linear joint detection algorithm, e.g., a ZF algorithm or an MMSE algorithm, and also a non-linear joint detection algorithm, e.g., a joint detection algorithm based on decision feedback demodulation such as a BDFE-MMSE algorithm. Of course, the soft output may be mapped into a modulated standard constellation point, i.e., a hard-decision procedure. The non-linear joint detection algorithm, such as the joint detection algorithm based on decision feedback demodulation, is more accurate as compared to the linear joint detection.

Figure 2:
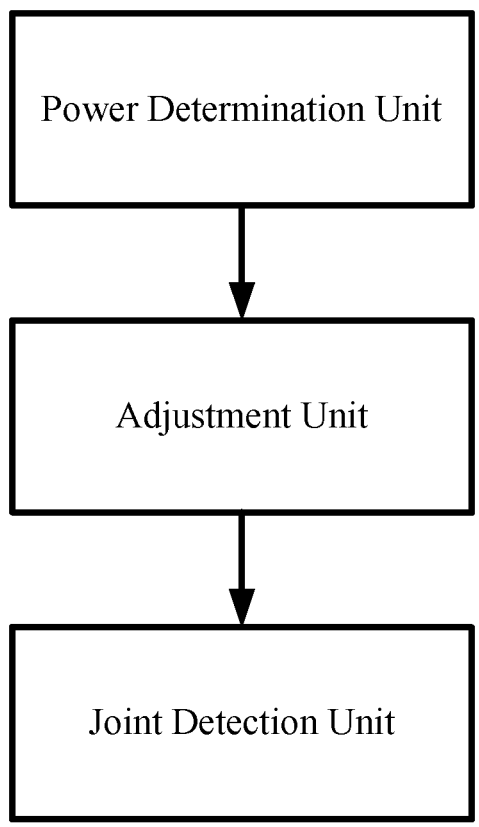
FIG. 2 is a schematic view showing the structure of an apparatus for joint detection according to some embodiments of the present invention.

The joint detection apparatus according to the embodiments of the present invention, as shown in FIG. 2, includes:

a power determination unit, configured to acquire a power of each of a number of codes in a matched filtering result of a received signal;

an adjustment unit, configured to adjust an ranking order of the codes in the matched filtering result and an ranking order of column vectors corresponding to the codes in a system submatrix based on the power of the code, to obtain an adjusted matched filtering result and an adjusted system submatrix; and a joint detection unit, configured to perform joint detection using the adjusted matched filtering result and the adjusted system submatrix, to acquire demodulated signals corresponding to the codes, wherein, when performing the joint detection, a first code is demodulated prior to a second code, and the power of the first code is greater than the power of the second code.

A receiver used in a Direct Sequence-Code Division Multiple Access system (e.g. TD-SCDMA system), which comprise a joint detection apparatus used for performing the following operations:

acquiring a power of each of a number of codes in a matched filtering result of a received signal;

adjusting an ranking order of the codes in the matched filtering result and an ranking order of column vectors corresponding to the codes in a system submatrix based on the power of the code, to obtain an adjusted matched filtering result and an adjusted system submatrix; and performing joint detection using the adjusted matched filtering result and the adjusted system submatrix, to acquire demodulated signals corresponding to the codes, wherein, when performing joint detection, a first code is demodulated prior to a second code, and the power of the first code is greater than the power of the second code.

Following are the detailed descriptions on the processing by combining the above-mentioned apparatus for joint detection and taking the BDFE-MMSE algorithm as an example.

At first, the joint detection apparatus uses an output $e_{mf}$ of the matched filter to acquire power of the codes in the output of the matched filter and then sorts the codes.

Presumed that the matched filter includes N symbols and each symbol includes Kru codes, the output $e_{mf}$ of the matched filter is:

$$e_{mf}=[e_{mf,1}^1, e_{mf,1}^2, \ldots, e_{mf,1}^{Kru}, e_{mf,2}^1, e_{mf,2}^2, \ldots, e_{mf,2}^{Kru}, \ldots, e_{mf,N}^1, e_{mf,N}^2, \ldots, e_{mf,N}^{Kru}]^T$$

Then, the joint detection apparatus calculates the power of each code by the following equation:

$$P^{(k)}=\Sigma_{i=1}^N |e_{mf,i}^k|^2, k=1,2,\ldots,Kru.$$

After obtaining the power of each code, the apparatus sorts the codes in the matched filtering result. In the adjusted matched filtering result, the higher the power of the codes, the lower the ranking order of the codes in the symbol. Presumed that $P^{(8)}>P^{(7)}>\ldots>P^{(1)}>P^{(2)}$, when the codes are re-sorted, the adjusted matched filtering result $e_{mf,sort}$ is:

$$[e_{mf,1}^2, e_{mf,1}^1, \ldots, e_{mf,1}^7, e_{mf,1}^8, e_{mf,1}^1, e_{mf,1}^2, \ldots, e_{mf,2}^7, e_{mf,2}^8, \ldots, e_{mf,N}^1, e_{mf,N}^2, \ldots, e_{mf,N}^7, e_{mf,N}^8]^T$$

Meanwhile, the joint detection apparatus also needs a matrix H which is generated based on a system matrix A. The system matrix is constructed according to a system submatrix B. In the embodiments of the present invention, after the codes in the symbol of the matched filtering result are re-sorted, the joint detection apparatus also needs to sort the system submatrix B corresponding to an original matched filtering signal. The higher the power of the codes, the lower the ranking order of the codes in the symbol.

Presumed that channel estimation is performed at the receiving end, the system submatrix B is obtained as follows:

$$B=[B_1,B_2,\ldots,B_{Kru}].$$

Because $P^{(8)}>P^{(7)}>\ldots>P^{(1)}>P^{(2)}$, when the vectors are re-sorted, a system submatrix $B_{sort}$ is:

$$B_{sort}=[B_2,B_1,\ldots,B_7,B_8].$$

Then, the joint detection apparatus generates a corresponding system matrix $A_{sort}$ using the sorted system submatrix $B_{sort}$, and performs Cholesky decomposition on the system matrix $A_{sort}$ to obtain a triangular matrix H.

For different joint detection algorithms, the calculation modes for the matrix H are different. For example, if an MMSE algorithm is used, $A_{sort}^H A_{sort}+\sigma^2 I=HH^H$.

After the matched filtering result $e_{mf,sort}$ is obtained and the codes are re-sorted and the matrix H corresponding to the system submatrix $B_{sort}$, the joint detection apparatus may perform joint detection to obtain a soft output of the signal as follows:

$$\hat{d}_{sort}=(A_{sort}^H A_{sort}+\sigma^2 I)^{-1} e_{mf,sort}=(HH^H)^{-1} e_{mf,sort}.$$

The solution procedure is detailedly described as follows. At first, presumed that $z=H^H \hat{d}_{sort}$, the equation $\hat{d}_{sort}=(HH^H)^{-1} e_{mf,sort}$ may be converted into the equation $Hz=e_{mf,sort}$. Because H is a triangular matrix, z can be calculated by iteration. After obtaining z, $\hat{d}_{sort}$ is solved using the equation $z=H^H \hat{d}_{sort}$. Then, $\hat{d}_{sort}$ is solved through the equation $z=H^H \hat{d}_{sort}$ using a decision feedback method.

The joint detection method that uses decision feedback differs from the joint detection method that does not use decision feedback in that, after obtaining a soft output $\hat{d}_{sort}(i)$ of each code i, hard decision and reconstruction are performed on the soft output, and then a soft output of a next code is solved using the reconstructed signal.

The reconstructed signal obtained by performing hard decision and reconstruction on the soft output is as follows:

$$d_{recons(i)}=Q\{\hat{d}_{sort}(i)\},$$

wherein $Q\{\bullet\}$ is a quantization process so as to map the soft output into the modulated standard constellation point, for example into the standard constellation pint of QSPK, i.e., a hard decision procedure.

There are various hard decision methods, and how to perform hard decision on the soft output is not a key point of the present invention.

Meanwhile, $\hat{d}_{sort}$ may also be reconstructed in a soft decision manner, and the reconstructed signals may be used for the subsequent solution.

The iterative demodulation procedure for the codes is described as follows.

At first, a last vector of $\hat{d}_{sort}$ is solved according the last equation of $z=H^H \hat{d}_{sort}$. Then, hard decision is performed on the last vector solved to obtain a hard decision result. The hard decision result of the last vector is substituted into the second equation from the last in $z=H^H \hat{d}_{sort}$, so as to solve a second vector from the last in $\hat{d}_{sort}$. Hard decision is then performed on the second vector from the last to obtain a hard decision result. The hard decision result of the last vector and the second vector from the last is substituted into the third equation from the last in $z=H^H \hat{d}_{sort}$, to solve a third vector from the last in $\hat{d}_{sort}$; . . . . All the vectors in $\hat{d}_{sort}$ can be solved by repeating the above procedures. Finally, $\hat{d}_{sort}$ is re-sorted to obtain the correct order of the demodulation results of the codes.

The method according to the embodiments of the present invention may be realized by hardware and/or software, thus the joint detection according to the embodiments of the present invention is adapted to be realized by processors such as a general processor and a signal processor. The computer program includes program codes which are stored in a computer-readable medium and can be loaded and executed via the processors so as to carry out the above-mentioned method.

The present invention also provides a storage medium storing the computer program.

In the embodiments of the present invention, the power of the codes is sorted and joint detection is performed using the sorted signals, thus the performance of the joint detection is improved. It can inhibit influence of MAI and ISI in a better manner based on the current joint detection algorithms, and can notably improve the performance of the receiver especially in the case of strong interference from the neighbor cells.

Figure 3:
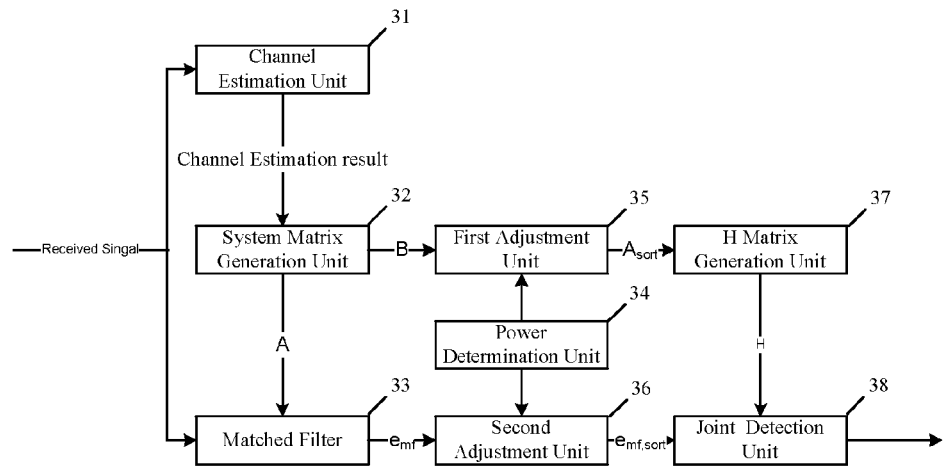
FIG. 3 is a schematic view showing the structure of a receiver which comprise the joint detection apparatus according to some embodiments of the present invention.
Figure 4:
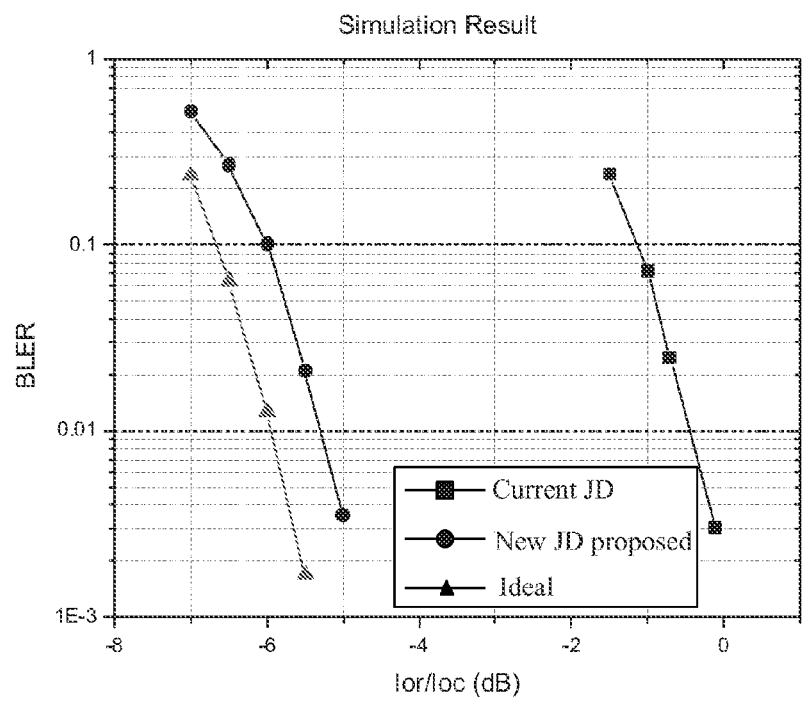
FIG. 4 is a schematic view showing the simulation result of the method for joint detection according to some embodiments of the present invention.

A receiver which comprises the joint detection apparatus according to the embodiments of the present invention, as shown in FIG. 3, includes:

a channel estimation unit 31, configured to perform channel estimation using the received signal to acquire a channel estimation result;

a system matrix generation unit 32, configured to generate a system matrix A using the channel estimation result;

a matched filter 33, configured to perform matched filtering using the received signal and the system matrix A to acquire a matched filtering result $e_{mf}$;

a power determination unit 34, configured to acquire a power of each of a number of codes in the matched filtering result of the received signal;

a first adjustment unit 35, configured to adjust a ranking order of column vectors in the system submatrix B based on the power of the code to acquire an adjusted system matrix $A_{sort}$;

a second adjustment unit 36, configured to adjust a ranking order of the codes in the matched filtering result $e_{mf}$ to acquire an adjusted matched filtering result $e_{mf,sort}$;

a H matrix generation Unit 37, configured to generate a H matrix using the adjusted system matrix $A_{sort}$;

a joint detection unit 38, configured to perform joint detection using the adjusted matched filtering result $e_{mf,sort}$ and the H matrix, to acquire demodulated signals corresponding to the codes;

wherein, in the adjusted matched filtering result, the higher the power of the code, the lower the ranking order of the code in the symbol, and in the adjusted system submatrix, the higher the power of the code, the lower the ranking order of the vector corresponding to the code, so the signal with higher power may be solved earlier. This inhibits an erroneous propagation effect and improves accuracy of the joint detection. In order to test the effect, stimulation is performed using the following stimulation conditions.

| | |
|---|---|
| Communication System | TD-SCDMA |
| Cell Number | 3 |
| Midamble | {19, 58, 85} |
| Modulation | {QPSK, QPSK, QPSK} |
| Channel Codes of SS #1* | 1, 2 |
| Channel Codes of SS #2* | 1, 2, 3, 4, 5, 6 |
| Channel Codes of SS #3* | 1, 2, 3, 4, 5, 6 |
| $\dfrac{DPCH_o\_Ec}{I_{oc}}$ of SS #2*, SS #3* | 10 dB, 4 dB |
| Ioc | −90 dBm |
| Channel | AWGN |

With the above stimulation configuration and channel environment, the simulation result is shown by FIG. 3. As can be seen from FIG. 3, when Ior/Ioc (the ratio of useful signal spectral density to interference spectral density) is used as a performance index, there exists a difference of about 5.5 dB between the current joint detection algorithms and the ideal performance. However, when the joint detection algorithm according to the embodiments of the present invention is used, such a difference will be reduced to about 0.8 dB.

The joint detection method based on decision feedback demodulation according to the embodiments of the present invention is advantageous in performance over the traditional algorithm, and such a performance advantage is more obvious in the case of strong interference signals.

What is claimed is:

1. A method for joint detection performed by a Direct Sequence-Code Division Multiple Access (DS-CDMA) system, the method comprising:
   acquiring a power of each of a number of codes in a matched filtering result of a received signal;
   adjusting a ranking order of the codes in the matched filtering result and a ranking order of column vectors in a system submatrix based on the power of the codes to obtain an adjusted matched filtering result and an adjusted system submatrix; and
   performing joint detection using the adjusted matched filtering result and the adjusted system submatrix to acquire demodulated signals corresponding to the codes,
   wherein, when performing the joint detection using the adjusted matched filtering result and the adjusted system submatrix, a first code is demodulated prior to a second code, and the power of the first code is greater than the power of the second code.

2. The method of claim 1 wherein the DS-CDMA system is a Time Division-Synchronous Code Division Multiple Access (TD-SCDMA) system.

3. The method of claim 1 wherein the power of the code with a code sequence number is a sum of a power of all elements with the code sequence number in the matched filtering result.

4. The method of claim 1 wherein:
   in the adjusted matched filtering result, the higher the power of the code, the lower the ranking order of the code in the symbol; and
   in the adjusted system submatrix, the higher the power of the code, the lower the ranking order of the vector corresponding to the code.

5. The method of claim 1 wherein, after acquiring the demodulated signals corresponding to the codes, the method further comprises recovering an order of the demodulated signals according to an original order of the codes in the matched filtering result to obtain a final demodulation result.

6. An apparatus for joint detection in a Direct Sequence-Code Division Multiple Access (DS-CDMA) system, comprising:
a processor circuit configured to:
acquire a power of each of a number of codes in a matched filtering result of a received signal;
adjust a ranking order of the codes in the matched filtering result and a ranking order of column vectors in a system submatrix based on the power of the codes, to obtain an adjusted matched filtering result and an adjusted system submatrix; and
perform joint detection using the adjusted matched filtering result and the adjusted system submatrix, to acquire demodulated signals corresponding to the codes,
wherein, when the processor circuit performs the joint detection using the adjusted matched filtering result and the adjusted system submatrix, a first code is demodulated prior to a second code, and the power of the first code is greater than the power of the second code.

7. The apparatus of claim 6 wherein the DS-CDMA system is a Time Division-Synchronous Code Division Multiple Access (TD-SCDMA) system.

8. The apparatus of claim 6 wherein the power of the code with a code sequence number is a sum of the power of all elements in the matched filtering result with the code sequence number.

9. The apparatus of claim 6 wherein:
in the adjusted matched filtering result, the higher the power of the code, the lower the ranking order of the code in the symbol; and
in the adjusted system submatrix, the higher the power of the code, the lower the ranking order of the vector corresponding to the code.

10. The apparatus of claim 6 wherein the processor circuit is further configured to execute a non-linear joint detection algorithm to perform the joint detection.

11. The apparatus of claim 10 wherein the non-linear joint detection algorithm is a joint detection algorithm based on decision feedback demodulation.

12. The apparatus of claim 6 wherein the processor circuit is further configured to recover a ranking order of the demodulated signals according to an original order of the codes in said matched filtering result, to obtain a final demodulation result, after acquiring the demodulated signals corresponding to the code.

13. A receiver used in a Direct Sequence-Code Division Multiple Access (DS-CDMA) system, which comprises a joint detection apparatus comprising:
a processor circuit configured to:
acquire a power of each of a number of codes in a matched filtering result of a received signal;
adjust a ranking order of the codes in the matched filtering result and a ranking order of column vectors in a system submatrix based on the power of the codes, to obtain an adjusted matched filtering result and an adjusted system submatrix; and
perform joint detection using the adjusted matched filtering result and the adjusted system submatrix, to acquire demodulated signals corresponding to the codes,
wherein, when the processing circuit performs the joint detection using the adjusted matched filtering result and the adjusted system submatrix, a first code is demodulated prior to a second code, and the power of the first code is greater than the power of the second code.

14. A computer program product comprising a non-transitory computer-readable medium having program codes stored thereon that, when executed by a processor circuit in a Direct Sequence-Code Division Multiple Access (DS-CDMA) system, configures the processor circuit to:
acquire a power of each of a number of codes in a matched filtering result of a received signal;
adjust a ranking order of the codes in the matched filtering result and a ranking order of column vectors in a system submatrix based on the power of the codes to obtain an adjusted matched filtering result and an adjusted system submatrix; and
perform joint detection using the adjusted matched filtering result and the adjusted system submatrix to acquire demodulated signals corresponding to the codes,
wherein, when performing the joint detection using the adjusted matched filtering result and the adjusted system submatrix, a first code is demodulated prior to a second code, and the power of the first code is greater than the power of the second code.

15. The computer program product of claim 14 wherein the DS-CDMA system is a Time Division-Synchronous Code Division Multiple Access (TD-SCDMA) system.

16. The computer program product of claim 14 wherein the power of the code with a code sequence number is a sum of a power of all elements with the code sequence number in the matched filtering result.

17. The computer program product of claim 14 wherein:
in the adjusted matched filtering result, the higher the power of the code, the lower the ranking order of the code in the symbol; and
in the adjusted system submatrix, the higher the power of the code, the lower the ranking order of the vector corresponding to the code.

18. The computer program product of claim 14 wherein the program codes further configure the processor circuit to recover an order of the demodulated signals according to an original order of the codes in the matched filtering result to obtain a final demodulation result after the demodulated signals corresponding to the codes are acquired.

19. A non-transitory computer-readable medium comprising computer program instructions stored thereon that, when executed by a processor circuit, configures the processor circuit to:
acquire a power of each of a number of codes in a matched filtering result of a received signal;
adjust a ranking order of the codes in the matched filtering result and a ranking order of column vectors in a system submatrix based on the power of the codes to obtain an adjusted matched filtering result and an adjusted system submatrix; and
perform joint detection using the adjusted matched filtering result and the adjusted system submatrix to acquire demodulated signals corresponding to the codes,
wherein, when performing the joint detection using the adjusted matched filtering result and the adjusted system submatrix, a first code is demodulated prior to a second code, and the power of the first code is greater than the power of the second code.

* * * * *